US 8,258,198 B2

(12) United States Patent
Andrew et al.

(10) Patent No.: US 8,258,198 B2
(45) Date of Patent: Sep. 4, 2012

(54) FAST DEMOLD/EXTENDED CREAM TIME POLYURETHANE FORMULATIONS

(75) Inventors: Gary Dale Andrew, Walnutport, PA (US); Mark Leo Listemann, Kutztown, PA (US); Patrick Gordon Stehley, Allentown, PA (US); James Douglas Tobias, Center Valley, PA (US); John William Miller, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1000 days.

(21) Appl. No.: 11/131,179

(22) Filed: May 18, 2005

(65) Prior Publication Data

US 2005/0267228 A1 Dec. 1, 2005

Related U.S. Application Data

(63) Continuation-in-part of application No. 10/856,042, filed on May 28, 2004, now abandoned.

(51) Int. Cl.
*B01J 31/02* (2006.01)

(52) U.S. Cl. ............. 521/170; 252/182.24; 252/182.26; 252/182.27; 252/182.28; 502/157; 502/167; 502/200

(58) Field of Classification Search .............. 502/167, 502/157, 200; 252/182.24, 182.26, 182.27, 252/182.28; 521/170
See application file for complete search history.

(56) References Cited

U.S. PATENT DOCUMENTS

| | | | |
|---|---|---|---|
| 3,836,488 A | 9/1974 | Pruitt et al. | |
| 3,896,052 A | 7/1975 | Lockwood et al. | |
| 4,143,003 A | 3/1979 | Haas et al. | |
| 4,150,206 A | 4/1979 | Jourquin et al. | |
| 4,191,815 A | 3/1980 | Jourquin et al. | |
| 4,338,408 A | 7/1982 | Zimmerman et al. | |
| 4,425,446 A | 1/1984 | Marwitz et al. | |
| 4,582,861 A | 4/1986 | Galla et al. | |
| 4,598,103 A * | 7/1986 | Chang | 521/126 |
| 5,039,713 A | 8/1991 | Petrella | |
| 5,143,944 A | 9/1992 | Savoca et al. | |
| 5,147,897 A * | 9/1992 | Morimoto et al. | 521/125 |
| 5,233,039 A | 8/1993 | Listemann et al. | |
| 5,508,314 A | 4/1996 | Listemann et al. | |
| 5,512,603 A | 4/1996 | Carr et al. | |
| 5,539,007 A | 7/1996 | Listemann et al. | |
| 5,559,161 A | 9/1996 | Klotz et al. | |
| 5,700,846 A | 12/1997 | Grigsby, Jr. et al. | |
| 5,756,557 A | 5/1998 | Kimock et al. | |
| 5,824,711 A | 10/1998 | Kimock et al. | |
| 5,844,012 A | 12/1998 | Petrella et al. | |
| 5,856,678 A * | 1/1999 | Smits et al. | 252/182.2 |
| 5,874,483 A | 2/1999 | Savoca et al. | |
| 6,291,538 B1 * | 9/2001 | Okubo et al. | 521/128 |
| 6,586,490 B1 * | 7/2003 | Dietrich et al. | 521/167 |
| 6,602,926 B1 | 8/2003 | Heiliger et al. | |
| 7,001,864 B2 * | 2/2006 | Kiso et al. | 502/155 |
| 7,671,104 B2 * | 3/2010 | Heinemann et al. | 521/130 |
| 2002/0026078 A1 * | 2/2002 | Tokumoto et al. | 564/291 |
| 2002/0068808 A1 * | 6/2002 | Kometani et al. | 528/54 |
| 2005/0070619 A1 * | 3/2005 | Miller | 521/114 |

FOREIGN PATENT DOCUMENTS

| | | |
|---|---|---|
| EP | 0 559 216 A1 | 9/1993 |
| EP | 0 656 382 B1 | 6/1995 |
| EP | 0 716 106 A2 | 6/1996 |
| EP | 0 499 873 B1 | 11/2000 |
| EP | 1 076 074 A1 | 2/2001 |
| JP | 62-20517 | 1/1987 |
| JP | 10-316653 | 12/1998 |
| WO | 00/67813 | 11/2000 |
| WO | 00/67814 | 11/2000 |
| WO | WO 00/67813 | 11/2000 |

OTHER PUBLICATIONS

European Search Report No. 05011237.4-2115 dated Nov. 28, 2005.

* cited by examiner

*Primary Examiner* — John Cooney
(74) *Attorney, Agent, or Firm* — Michael K. Boyer

(57) ABSTRACT

Catalyst compositions for use in forming polyurethane products include a gelling catalyst, a trimerization catalyst, and a cure accelerator. The gelling catalyst is a tertiary amine, mono(tertiary amino) urea, bis(tertiary amino) urea, or a combination of any of these. Any known trimerization catalyst may be used. The cure accelerator may be a diol having at least one primary hydroxyl group, and having from five to 17 chain backbone atoms chosen from carbon, oxygen, or both between the hydroxyl groups, provided that at least five of the backbone atoms are carbon. Alternatively or in addition, the cure accelerator may be a polyol having three or more hydroxyl groups, at least two of which are primary, and having molecular weights between 90 g/mole and 400 g/mole. Delayed initiation of the polyurethane-forming reaction and/or reduced demold time for producing the polyurethane part can be obtained by using these catalyst compositions.

15 Claims, No Drawings

FAST DEMOLD/EXTENDED CREAM TIME POLYURETHANE FORMULATIONS

CROSS-REFERENCE TO RELATED APPLICATIONS

The present application is a continuation-in-part of application Ser. No. 10/856,042 filed 28 May 2004 now abandoned which is hereby incorporated by reference.

BACKGROUND OF THE INVENTION

The invention relates to polyurethane products and methods for producing them. More particularly, it relates to catalyst compositions for forming the polyurethane products.

Manufacturers of polyurethane articles require ever-improving processing technology to meet the escalating pressures of cost efficiency and complicated part design. Two important parameters affecting the ability of a manufacturer to meet these challenges are the ability to fill the mold completely and rapidly before the initiation of the polyurethane reactions increases the viscosity, and the ability of the system to cure very rapidly thereafter so that the part can be quickly removed from the mold ("demolded"). It is desirable for the polyurethane-forming composition not to react significantly or increase excessively in viscosity until it has essentially filled the mold. Delaying the polyurethane initiation time in this way provides a longer time window for filling the mold, thereby allowing the production of more complex parts, and frequently also allows for longer screw cleaning cycles. At the same time, reducing the overall reaction time increases the productivity of the expensive capital equipment used for making the parts. The total elapsed time from the beginning of injection into the mold until the part is removed is commonly referred to as "demold time". Both initiation time and demold time can be strongly affected by the choice of type and amount of catalyst. However, catalysts that delay the onset of the polyurethane-forming reaction also frequently increase the demold time, thus increasing incremental cost.

At the same time, there is a trend toward the production of polyurethane foams having lower and lower densities, which tends to increase demold times, thereby further hurting productivity. Thus there is an increasing need for a delayed action catalyst, i.e. a catalyst that will delay the onset of reaction of the isocyanate, commonly referred to as "initiation time" or "cream time," and still not substantially increase the demold time. Alternatively, there is also a need for a catalyst that will yield the same initiation time with a shorter demold time. Thus improved polyurethane catalyst systems are sought in the industry.

BRIEF SUMMARY OF THE INVENTION

In one aspect, the invention provides a composition for use in making a polyurethane foam. The composition includes a catalyst combination containing a gelling catalyst and a trimerization catalyst, wherein the gelling catalyst is selected from the group consisting of tertiary amines, mono(tertiary amino)ureas, bis(tertiary amino) ureas, and combinations of any of these. The composition also includes one or more cure accelerators selected from one or both of:
i) a first group consisting of diols comprising at least one primary hydroxyl group, and having from five to 17 chain backbone atoms chosen from carbon, oxygen, or both between the hydroxyl groups, provided that at least five of the backbone atoms are carbon; and
ii) a second group consisting of compounds comprising three or more hydroxyl groups, at least two of which are primary, and having molecular weights between 90 g/mole and 400 g/mole.

In another aspect, the invention provides a method of making a polyurethane foam. The method includes mixing together a polymeric polyol, a polyisocyanate, and a composition as described immediately above.

In a further aspect, the invention provides a polyurethane composition including a product of a reaction between a polymeric polyol and a polyisocyanate, the reaction taking place in the presence of a composition as described above.

DETAILED DESCRIPTION OF THE INVENTION

This invention provides methods and formulations for preparing polyurethane products by the reactions of an organic polyisocyanate with a polymeric polyol (i.e. a polyester or polyether polyol) and water in the presence of a catalytically effective amount of a catalyst composition comprising a gelling catalyst, a cure accelerator, and a trimerization catalyst. Optionally, a blowing catalyst and/or a chain extender may also be included, but neither of these is required. Catalyst compositions including these components can provide improvements in demold time or initiation time, or both.

Catalyst compositions according to the invention are typically used at a level of 0.1-5 parts per hundred parts polyol (pphp). The catalyst compositions may include the gelling catalyst, trimerization catalyst, blowing catalyst and cure accelerator in a wide range of proportions; typical non-limiting ranges are as follows.

| Component | Typical Range (wt %) | Preferred Range (wt %) | Most Preferred Range (wt %) |
|---|---|---|---|
| Gelling catalyst | 0.1-40 | 14-35 | 24-32 |
| Trimerization catalyst | 0.1-8 | 1.4-6 | 2-5 |
| Blowing catalyst | 0-24 | 0.8-4 | 1-3 |
| Cure accelerator | 28-99.8 | 55-83.8 | 60-73 |

Such catalyst composition may optionally be diluted with a chain extender to afford a composition comprising the catalyst composition and the chain extender in a wide range of proportions; typical non-limiting ranges are as follows:

| Component | Typical Range (wt %) | Preferred Range (wt %) | Most Preferred Range (wt %) |
|---|---|---|---|
| Catalyst composition | 5-100 | 25-75 | 55-65 |
| Chain extender | 0-95 | 25-75 | 35-45 |

The components will now be described separately in detail.

Gelling Catalyst

Any gelling catalyst known in the art may be used according to the invention. A gelling catalyst is any tertiary amine catalyst known in the urethane art with an initial selectivity of less than 0.7. Catalyst selectivity is defined as the ratio of the rate of blowing (urea formation) to the rate of gelling (urethane formation) [J. Cellular Plastics, Vol. 28, 1992, pp. 360-398]. In one embodiment of the invention, the gelling catalyst comprises a tertiary amine or a mono(tertiary amino) or bis(tertiary amino) urea derivative thereof. One exemplary tertiary amine is triethylenediamine (TEDA), also known as 1,4-diazabicyclo[2.2.2]octane, although others known in the art may also be used. Other suitable gelling catalysts include N,N-bis(3-dimethylaminopropyl)-N-isopropanolamine, N,N,N'',N''-tetramethyldipropylenetriamine, N,N-bis(3-dimethylaminopropyl)-1,3-propanediamine, dimethylaminopropylamine, N-dimethylaminopropyl-N-methylethanolamine, quinuclidine and substituted quinuclidines (U.S. Pat. No. 5,143,944 and U.S. Pat. No. 5,233,039), substituted pyrrolizidines (U.S. Pat. No. 5,512,603), and substituted pyrrolidines (EP 499 873).

In general, urea compounds of tertiary amines suitable for use as gelling catalysts include compounds represented by the general formula:

$$\begin{array}{c} R^4 \\ \diagdown \\ A-(CR^2R^3)_n-NR^1-CO-NR^6R^7 \\ \diagup \\ R^5 \end{array}$$

in which:
A represents CH or N;
$R^1$ represents hydrogen or the group $$\begin{array}{c} R^4 \\ \diagdown \\ A-(CR^2R^3)_n- \\ \diagup \\ R^5 \end{array}$$

n represents an integer between 1 and 6, inclusive;
$R^2$ and $R^3$ each represent hydrogen or a C1-C6 alkyl group; and
$R^4$ and $R^5$ each represent a C1-C6 alkyl group or together represent a C2-C6 alkylene group which may contain a ring oxygen or amine moiety —NR—, where R is hydrogen, a C1-C4 alkyl group, or the group —$(CR^2R^3)_n$—$NR^1$—CO—$NR^6R^7$, wherein
$R^6$ and $R^7$ each individually represent H or the group $$\begin{array}{c} R^4 \\ \diagdown \\ A-(CR^2R^3)_n- \\ \diagup \\ R^5 \end{array}.$$

Suitable specific urea derivatives of tertiary amines include, as nonlimiting examples, 2-dimethylaminoethyl urea; N,N'-bis(2-dimethylaminoethyl) urea; N,N-bis(2-dimethylaminoethyl) urea; 3-dimethylaminopropyl urea; N,N'-bis(3-dimethylaminopropyl) urea; N,N-bis(3-dimethylaminopropyl) urea; 1-(N-methyl-3-pyrrolidino)methyl urea; 1,3-bis(N-methyl-3-pyrrolidino)methyl urea; 3-piperidinopropyl urea; N,N'-bis(3-piperidinopropyl) urea; 3-morpholinopropyl urea; N,N'-bis(3-morpholinopropyl) urea; 2-piperidinoethyl urea; N,N'-bis(2-piperidinoethyl) urea; 2-morpholinoethyl urea; and N,N'-bis(2-morpholinoethyl) urea.

Trimerization Catalyst

Suitable trimerization catalysts for use according to the invention include any such catalysts known in the art. Specific nonlimiting examples include N,N',N''-tris(dimethylaminopropyl)hexahydrotriazine and N-hydroxyalkyl quaternary ammonium carbonylate or carboxylate salts, such as are disclosed in U.S. Pat. No. 4,582,861 to Galla et al. Also useful are alkali metal carboxylate salts, nonlimiting examples of which are alkali salts of the carboxylic acids mentioned later herein for use in "blocking" (i.e. forming a salt with) amine-containing catalysts. One exemplary carboxylate salt is potassium 2-ethylhexanoate. Other suitable alkali carboxylate trimerization catalysts are sodium N-(2-hydroxyphenyl)methylglycinate, as disclosed in U.S. Pat. No. 3,896,052, and sodium N-(2-hydroxy-5-nonylphenyl)methyl-N-methylglycinate. Especially effective trimerization catalysts are 1,8-diazabicyclo[5.4.0]undec-7-ene blocked with a phenol or a carboxylic acid, and TEDA propylene oxide quat salts, having the following structure $$\begin{array}{c} R_3 \\ | \\ N\diagdown N^{\oplus}-CH_2CH-OH \\ A^{\ominus} \end{array}$$

where $A^-$ is 2-ethylhexanoate or any of the blocking acids recited herein below and each $R_3$ is independently selected from H, C1-C10 alkyl, C6-C10 aryl, and CH2-O—$R^4$, where $R^4$ is C1-C15 alkyl, aryl, or aralkyl. In one embodiment, each $R^3$ is methyl.

Blowing Catalyst

A considerable number of blowing catalysts are known in the polyurethane art, and any of these may be used according to the invention. A blowing catalyst is any tertiary amine catalyst known in the urethane art with an initial selectivity of greater than 0.8. Catalyst selectivity is defined as the ratio of the rate of blowing (urea formation) to the rate of gelling (urethane formation) [J. Cellular Plastics, Vol. 28, 1992, pp. 360-398]. Examples of suitable tertiary amine blowing catalysts include but are not restricted to bis(dimethylaminoethyl) ether, commercially supplied as DABCO® BL-11 catalyst by Air Products and Chemicals, Inc. of Allentown, Pa., pentamethyldiethylenetriamine and related compositions (U.S. Pat. No. 5,039,713, U.S. Pat. No. 5,559,161), higher permethylated polyamines (U.S. Pat. No. 4,143,003), branched polyamines (U.S. Pat. No. 3,836,488), 2-[N-(dimethylaminoethoxyethyl)-N-methylamino]ethanol and related structures (U.S. Pat. No. 4,338,408), alkoxylated polyamines (U.S. Pat. No. 5,508,314), imidazole-boron compositions (U.S. Pat. No. 5,539,007), and aminopropyl-bis(aminoethyl)ether compositions (U.S. Pat. No. 5,874,483 and U.S. Pat. No. 5,824,711). Typically used blowing catalysts according to the invention are pentamethyldiethylenetriamine and permethylated triethylenetetramine.

Cure Accelerator

Cure accelerators according to the invention include compounds in either or both of two categories. The first category consists of diols comprising at least one primary hydroxyl group, and preferably two primary hydroxyl groups, the two hydroxyl groups being connected by an organic radical containing from five to 17 backbone atoms (chain, ring, or combination thereof) chosen from carbon, oxygen, or both, provided that at least five of the backbone atoms are carbon. Exemplary diols in this category include 1,5-pentanediol, 1,6-hexanediol, and all of the homologous diols including up to a straight-chain C17 diol, as well as any of these diols substituted with one or more C1-C4 alkyl groups. Other exemplary diols include polyethylene glycols having from 2 to 6 ethylene oxide units, and polypropylene glycols having from 2 to 6 propylene oxide units.

The second category of cure accelerators includes compounds comprising three or more hydroxyl groups, at least two of which are primary hydroxyls, having molecular weights between about 90 g/mole and about 400 g/mole. Typically the molecular weight will be between about 90 g/mole and about 260 g/mole. In one embodiment of the invention, cure accelerators of this category include no amine or nitrogen-containing heterocyclic functionality and no carboxylic acid functionality. Suitable nonlimiting examples include glycerol, diglycerol, trimethylolpropane, pentaerythritol, and dipentaerythritol.

It is important to note that the cure accelerators are present in the compositions of the invention as the compounds themselves, and not in reacted form as part of a polyester polyol or polyether polyol. The same compounds that are used as cure accelerators may be additionally present in reacted form (e.g. as esters or ethers derived from them) in such polyester or polyether polyols, but they do not have the same effect and are not cure accelerators according to the invention.

Chain Extender

Suitable chain extenders for use according to the invention include ethylene glycol, 1,4-butanediol, and combinations of these.

Blocking Acids and Phenols

In one embodiment of the invention, some or all of the gelling, blowing, and trimerization catalyst may be "blocked" with (i.e. a salt formed with) a carboxylic acid salt, a phenol, or a substituted phenol, assuming that the catalyst contains amine functionality with which to form a salt. It should be noted that the catalyst as added to a polyurethane formulation may contain the carboxylic acid or phenol already present, or the acid or phenol may be added with one or more of the other ingredients in the formulation, thereby forming the salt in situ. By providing the catalyst composition in the form of such a salt, a delayed onset of catalyst activity may be achieved. This may be beneficial in some applications, for example where a delay in viscosity increase is desired in order to facilitate mold filling.

Many carboxylic acids are suitable for blocking any or all of the gelling, blowing, and trimerization catalyst components according to the invention. Nonlimiting examples include formic acid, acetic acid, propionic acid, 2-ethylhexanoic acid, aryloxy-substituted carboxylic acids such as phenoxyacetic acid and (dichlorophenoxy)acetic acid, and halogenated acids such as 2-chloropropionic acid and a ring-halogenated aromatic carboxylic acids such as chlorobenzoic acid. Further nonlimiting examples of suitable acids include hydroxy acids such as gluconic acid, hydroxyacetic acid, tartaric acid, and citric acid. It will be understood by those of ordinary skill in the art that certain acids in combination with certain gelling/blowing catalyst combinations, as a part of certain overall compositions of the polyurethane formulation, may detract from some performance properties of the overall composition and process, for example relating to the emission of volatile organic compounds (VOC's) during and/or after forming the polyurethane. The determination of acceptable combinations of acids with catalysts for a given application may therefore require some amount of routine experimentation, such as is within the ability of the skilled artisan, with such combinations still falling within the scope of the invention.

Any of a number of phenols may be used for forming salts with any or all of the gelling, blowing, and trimerization catalyst components. Suitable nonlimiting examples include nonylphenol, isopropylphenol, octylphenol, and tert-butylphenol. Also useful are dialkylphenols, for example diisopropylphenol and di-tert-butylphenol. Typically, phenol itself is used.

Polyisocyanate

Polyurethanes prepared using the catalysts of this invention made be made from any of a wide variety of polyisocyanates known in the art. Examples of suitable polyisocyanates include hexamethylene diisocyanate, phenylene diisocyanates, toluene diisocyanates, and 4,4'-diphenylmethane diisocyanate. Especially suitable are the 2,4- and 2,6-toluene diisocyanates individually or together as their commercially available mixtures. Other suitable mixtures of diisocyanates are those known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially pre-reacted mixture of polyisocyanates and polyether or polyester polyol.

Polyol

Polyurethanes prepared using the catalysts of this invention made be made from any of a wide variety of polyols known in the art. Suitable polyols for use in making polyurethane formulations catalyzed by the catalyst compositions of the invention are the polyalkylene ether polyols and polyester polyols. The polyalkylene ether polyols include poly(alkylene oxide) polymers such as poly(ethylene oxide) and poly(propylene oxide) polymers and copolymers having terminal hydroxyl groups derived from polyhydric compounds including diols and triols, such as for example ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, cyclohexanediol and like low molecular weight polyols. Useful polyester polyols include those produced by reacting a dicarboxylic acid with an excess of a diol, for example adipic acid with ethylene glycol, diethylene glycol or 1,4-butanediol, or reacting a lactone such as caprolactone with an excess of a diol such as propylene glycol. Other polyols are known in the art, and their use is also contemplated according to the invention.

Polyurethanes according to the invention may also include any of a variety of other ingredients known in the polyurethane art, including blowing agents such as water, methylene chloride, trichlorofluoromethane, hydrocarbons, hydrofluorocarbons and the like, cell stabilizers such as silicones, and organometallic catalysts such as dibutyltin dilaurate.

Catalyst compositions according to the invention provide short demold times while maintaining acceptably long initiation time when compared to a system containing solely a tertiary amine in the presence of ethylene glycol or a tertiary amine-trimerization catalyst combination in the presence of ethylene glycol. Alternatively, demold time can be maintained while lengthening cream time to improve mold filling.

In the following examples and tables use levels of the components other than the polyols according to paragraph [0024] are in pphp of such polyols unless indicated otherwise. General exemplary polyurethane formulations containing catalyst compositions according to the invention may include formulations such as set forth in any of Tables 1-4.

TABLE 1

| Polyether Polyol-Based Polyurethane Formulation | |
|---|---|
| Polyether polyol | 100 |
| Chain Extender (1,4-butanediol or ethylene glycol) | 2-15 |
| Water | 0-0.4 |
| Cell stabilizer (silicone surfactant) | 0-0.5 |
| Water or organic blowing agent | 0.1-2.5 |
| Organometallic catalyst (dibutyltin dilaurate) | 0-0.3 |
| Tertiary amine (triethylenediamine) | 0.1-0.8 |
| 1,8-Diazabicyclo[5.4.0] undec-7-ene or N-hydroxyalkyl quaternary ammonium carboxylate salt | 0.02-0.06 |
| Cure accelerator (glycerol) | 0.2-3.0 |
| Isocyanate prepolymer*, free NCO % | 96-105 Index, 17-22% |

TABLE 1-continued

Polyether Polyol-Based Polyurethane Formulation

*MDI or TDI or both

TABLE 2

Polyester Polyol-Based Polyurethane Formulation

| | |
|---|---|
| Polyester polyol | 100 |
| Chain Extender (ethylene glycol or 1,4-butanediol) | 4-15 |
| Water | 0-1.5 |
| Cell stabilizer (silicone surfactant) | 0-1.5 |
| Tertiary amine (triethylenediamine) | 0.1-0.8 |
| 1,8-Diazabicyclo[5.4.0]undec-7-ene or N-hydroxyalkyl quaternary ammonium carboxylate salt | 0.02-0.06 |
| Cure accelerator (glycerol) | 0.2-3.0 |
| Isocyanate prepolymer, free NCO % | 96-104 Index, 16-23% NCO |

TABLE 3

Flexible Foam Formulation

| Flexible Foam | Parts by Weight (pphp) |
|---|---|
| Conventional Polyether Polyol (~5000 MW Triol) | 20-100 |
| Co-Polymer Polyol* | 0-80 |
| Silicone Surfactant | 1-2.5 |
| Blowing Agent | 2-4.5 |
| Crosslinker (diethanolamine) | 0.5-3 |
| Catalyst of invention | 0.1-5 |
| Isocyanate | 70-115 Index |

*styrene-acrylonitrile polyol

TABLE 4

Rigid Formulation

| Rigid Foam Formulation | Parts by Weight (pphp) |
|---|---|
| Polyol | 100 |
| Silicone Surfactant | 1-4 |
| Blowing Agent | 2-35 |
| Catalyst of invention | 0.1-5 |
| Water | 0-5 |
| Isocyanate | 70-300 Index |

EXAMPLES

Catalyst compositions were tested using a low-pressure shear machine, manufactured by The Edge Sweets Company, Inc. of Grand Rapids, Mich., with a screw speed of 6,000 RPM. Premix and prepolymer temperatures were maintained at 43° C. Each initiation time was recorded as the "cream time," i.e. the time at which a lightening of the color of the formulation and an increase in volume indicated the onset of foam formation. A mold with the dimensions of 30×15×1 cm was heated to 55° C. Each demold time was determined by demolding the part at the desired time and bending 180 degrees. When no cracking was observed the part was considered to have reached optimum demold. The densities of all parts were maintained at 0.50-0.55 grams per cubic centimeter (g/cc) throughout the study. The formulation in Table 5 was used for this study. The indicated polyester polyol is difunctional.

TABLE 5

Standard Test System

| Component | pphp |
|---|---|
| Polyester polyol NB 93708 from Dow Chemical | 100.00 |
| Ethylene glycol | 8.00 |
| Water (total) | 0.46 |
| Silicone surfactant DC 193 | 0.40 |
| MDI prepolymer (18.22% NCO) | 98-100 Index |

Table 6 shows the standard reactivities of the system using triethylenediamine as the control catalyst. A standard demold time when using 0.5 pphp of triethylenediamine (TEDA) was 4'30" (4 minutes 30 seconds) with a cream time of 9 seconds. Increasing triethylenediamine to 0.66 pphp reduced demold times to 3'45", but cream or initiation time was also reduced to 7 seconds. Such a reduction would in practice tend to negatively affect the ability to fill the mold because of the shortened reaction start time, leading to increased scrap or repair rates.

TABLE 6

Control Catalyst Composition

| Catalyst And Carriers Used | Control (pphp) | Control (pphp) |
|---|---|---|
| Contained Triethylenediamine (TEDA) | 0.50 | 0.66 |
| Ethylene Glycol | 1.00 | 1.34 |
| Use Level Of Catalyst Composition (33.3 wt % TEDA in ethylene glycol) | 1.50 | 2.00 |
| Cream Time (seconds) | 9.00 | 7.00 |
| Demold Time (minutes and seconds) | 4'30" | 3'45" |

Table 7 shows the formulation of a catalyst composition (Composition 1) according to the invention. The composition utilizes glycerol as a cure accelerator in combination with 1,8-diazabicyclo[5.4.0]undec-7-ene phenol salt and triethylenediamine to improve demold times. The results of an evaluation performed on Catalyst Composition 1 are shown in Table 8, where it is seen that, compared to the control composition of Table 6, this composition did not have a negative impact on physical properties but did dramatically reduce demold time and extend cream time. Glycerol is not typically used in this type of formulation since it is known to soften the foam excessively.

TABLE 7

Catalyst Composition 1

| Component | % |
|---|---|
| Triethylenediamine (TEDA) | 17.10 |
| Pentamethyldiethylenetriamine | 1.00 |
| 1,8-Diazabicyclo[5.4.0]undec-7-ene phenol salt (SA-1) | 1.90 |
| Ethylene glycol | 40.00 |
| Glycerol | 40.00 |

TABLE 8

Performance of Catalyst Composition 1

| Catalyst And Carriers Used | Catalyst 1 | Catalyst 1 | Catalyst 1 | Catalyst 1 | Catalyst 1 |
|---|---|---|---|---|---|
| Use Level Of Catalyst Composition | 1.50 | 2.00 | 2.20 | 2.60 | 2.80 |
| TEDA | 0.2565 | 0.3420 | 0.3762 | 0.4446 | 0.4788 |
| Ethylene glycol | 0.6000 | 0.8000 | 0.8800 | 1.0400 | 1.1200 |
| 1,8-Diazabicyclo[5.4.0]undec-7-ene phenol salt | 0.0285 | 0.0380 | 0.0418 | 0.0494 | 0.0532 |
| Pentamethyldiethylenetriamine | 0.0150 | 0.0200 | 0.0220 | 0.0260 | 0.0280 |
| Glycerol | 0.6000 | 0.8000 | 0.8800 | 1.0400 | 1.1200 |
| Total | 1.5000 | 2.0000 | 2.2000 | 2.6000 | 2.8000 |
| Cream Time (seconds) | 17 | 14 | 13 | 12 | 11 |
| Demold Time (min and sec) | 4'45" | 4'00" | 3'30" | 3'15" | 2'15" |

Catalyst Composition 1 at 2.80 pphp provided the closest match to the nine-second cream time of the control (0.5 pphp contained TEDA) while reducing demold time from 4'30" to 2'45". A two-second increase in cream time was also observed. When matching the demold time of the TEDA control (0.66 pphp contained TEDA) by using 2.0-2.2 pphp of Catalyst Composition 1, the cream time of seven seconds was extended to 13-14 seconds. In commercial practice, such an improvement would be expected to provide superior mold filling performance.

Table 9 illustrates the effects of removing any one of several components (cure accelerator, trimerization catalyst or blow catalyst) from the preferred catalyst composition.

TABLE 9

Counter Example Reactivities

| Catalyst And Carriers Used | Control | Control With Glycerol | Control | Control With Glycerol | Control With SA-1 | Control with SA-1 and PC5 | Catalyst 1 |
|---|---|---|---|---|---|---|---|
| Use Level Of Catalyst Composition | 1.50 | 1.50 | 2.00 | 2.00 | 1.50 | 2.00 | 2.80 |
| TEDA | 0.50 | 0.5000 | 0.6600 | 0.6600 | 0.4665 | 0.3420 | 0.4788 |
| Ethylene glycol | 1.00 | 0.5000 | 1.3400 | 1.3400 | 1.0050 | 1.6000 | 1.1200 |
| 1,8-Diazabicyclo[5.4.0]undec-7-ene phenol salt (SA-1) | 0 | 0.0000 | 0 | 0.0000 | 0.0285 | 0.0380 | 0.0532 |
| Pentamethyldiethylenetriamine (PC5) | 0 | 0.0000 | 0 | 0.0000 | 0.0000 | 0.0200 | 0.0280 |
| Glycerol | 0 | 0.5000 | 0 | 1.0000 | 0.0000 | 0.0000 | 1.1200 |
| Total | 1.50 | 1.5000 | 2.0000 | 2.0000 | 1.5000 | 2.0000 | 2.8000 |
| Cream time (seconds) | 9 | 10 | 7 | 8 | 9 | 7 | 11 |
| Demold Time (min and sec) | 4'30" | 4'15" | 3'45" | 3'45" | 4'00" | 3'30" | 2'25" |

1,8-diazabicyclo[5.4.0]undec-7-ene phenol salt and glycerol, when used separately in catalyst formulations, provided only a small advantage in cream or demold times. Addition of glycerol to the control catalyst (1.5 pphp control catalyst) increased cream time by only one second and reduced demold time by 15 seconds. Addition of glycerol to the control catalyst (2.0 pphp control catalyst) also increased cream time by one second but did not reduce demold.

Addition of 1,8-diazabicyclo[5.4.0]undec-7-ene phenol salt to the 1.5 pphp control catalyst did not extend cream time and only reduced demold time by 30 seconds. Addition of 1,8-diazabicyclo[5.4.0]undec-7-ene phenol salt and pentamethyldiethylene-triamine blow catalyst to the 2.0 pphp control catalyst shortened cream time by one second while reducing demold by only 15 seconds. In contrast, Catalyst Composition 1 used at a level of 2.8 pphp provided a substantial demold time reduction to 2'25" while improving cream time to 11 seconds.

As shown by the foregoing results, the combination of a tertiary amine gelling catalyst, a trimerization catalyst such as 1,8-diazabicyclo[5.4.0]undec-7-ene phenol salt, a cure accelerator such as glycerol, and optionally a blowing catalyst such as pentamethyldiethylenetriamine, provided significant improvements to cream and demold times.

Table 10 shows a catalyst formulation that was used for comparison of several diols and triols as potential cure accelerators. Only the diol/triol was changed during the evaluation.

TABLE 10

Catalyst Compositions For Diol/Polyol Evaluation

| Component | % |
|---|---|
| Triethylenediamine (TEDA) | 17.10 |
| 1,8-Diazabicyclo[5.4.0]undec-7-ene Phenol salt | 1.90 |
| Pentamethyldiethylenetriamine | 1.00 |
| Cure Accelerator (type varied) | 80.00 |

Tables 11-13 summarize the reactivity results as a function of diol or polyol structure and at three catalyst composition use levels.

TABLE 11

Reactivity, 1.5 pphp Catalyst Composition

| Cure Accelerator | Demold Minutes | Cream Seconds | Density g/cc |
|---|---|---|---|
| Ethylene Glycol (Control) | 4'30" | 17 | 0.52 |
| Glycerol | 3'30" | 18 | 0.54 |
| 2,5-Hexanediol | 10'00" | 17 | 0.53 |
| 1,6-Hexanediol | 4'45" | 16 | 0.55 |
| Tripropylene Glycol | 10'00" | 16 | 0.52 |
| Trimethylolpropane | 3'45" | 17 | 0.53 |
| Diethylene Glycol | 5'45" | 17 | 0.55 |

TABLE 12

Reactivity, 2.2 pphp Catalyst Composition

| Cure Accelerator | Demold Minutes | Cream Seconds | Density g/cc |
|---|---|---|---|
| Ethylene Glycol (control) | 3'45" | 12 | 0.53 |
| Glycerol | 3'00" | 13 | 0.54 |
| 2,5-Hexanediol | 7'30" | 12 | 0.54 |
| 1,6-Hexanediol | 3'30" | 11 | 0.55 |
| Tripropylene Glycol | 6'45" | 12 | 0.52 |
| Trimethylolpropane | 3'00" | 12 | 0.53 |
| Diethylene Glycol | 3'45" | 12 | 0.54 |

TABLE 13

Reactivity, 2.8 pphp Catalyst Composition

| Cure Accelerator | Demold Minutes | Cream Seconds | Density g/cc |
|---|---|---|---|
| Ethylene Glycol (control) | 3'30" | 9 | 0.54 |
| Glycerol | 2'25" | 11 | 0.53 |
| 2,5-Hexanediol | 5'00" | 10 | 0.55 |
| 1,6-Hexanediol | 2'45" | 9 | 0.52 |
| Tripropylene Glycol | 5'30" | 9 | 0.55 |
| Trimethylolpropane | 2'30" | 10 | 0.54 |
| Diethylene Glycol | 3'00" | 9 | 0.55 |

Table 11 demonstrates results with other low molecular weight diols and polyols: at 1.5 pphp catalyst use level glycerol and trimethylolpropane provided shorter demold with equal cream or initiation times when compared to the control ethylene glycol. Demold time using 1,6-hexanediol was equal to that of ethylene glycol, and equal cream time was observed. Use of 2,5-hexanediol, tripropylene glycol and diethylene glycol all resulted in longer demold times at cream time equal to that of the ethylene glycol control.

Table 12 demonstrates that at 2.2 pphp catalyst use level glycerol, trimethylolpropane and 1,6-hexanediol all showed improved demold time over the control. Cream times or initiation times were equal to or longer than that obtained with the control (ethylene glycol). Diethylene glycol showed equal demold and cream times to the control, while 2,5-hexanediol and tripropylene glycol showed extended demold times as compared to the ethylene glycol control.

Table 13 demonstrates that at 2.8 pphp catalyst use level the trend observed at 2.2 pphp use level remained the same: glycerol, trimethylolpropane and 1,6-hexanediol all showed improved demold time over the control. Cream times or initiation times were equal to the control ethylene glycol. Diethylene glycol showed a moderate improvement over the control ethylene glycol, while 2,5-hexanediol and tripropylene glycol continued to show extended demold times when compared to the ethylene glycol control.

Trimerization Catalyst Evaluations

Several trimerization catalysts were evaluated to understand the beneficial effect they might have in a system containing glycerol. The N-hydroxypropyl quaternary ammonium carboxylate salt of TEDA (U.S. Pat. No. 4,785,025), N,N',N"-tris(dimethylaminopropyl) hexahydrotriazine and 1,8-diazabicyclo[5.4.0]undec-7-ene (DBU) blocked with either phenol or 2-ethylhexanoic acid were evaluated using the following catalyst formulation:

TABLE 14

Formulation for Catalyst Variations

| Component | wt % |
|---|---|
| Triethylenediamine (TEDA) | 17.10 |
| Trimerization catalyst | Varied |
| Pentamethyldiethylenetriamine | 1.00 |
| Glycerol | 40 |
| Ethylene Glycol | 40 |

The results obtained with these formulations are shown in Table 15.

TABLE 15

Trimerization Catalyst Evaluations

| Trimerization Catalyst | Demold (min.) | Cream (sec.) | Trimerization Catalyst wt % |
|---|---|---|---|
| 1,8-Diazabicyclo[5.4.0]undec-7-ene phenol salt | 3'00" | 13 | 1.90 |
| 1,8-Diazabicyclo[5.4.0]undec-7-ene 2-ethylhexanoic acid salt | 3'30" | 12 | 2.9 |
| TEDA propylene oxide 2-ethylhexanoic acid quat | 3'30 | 12 | 3.0 |
| N,N',N"-tris(dimethyl-aminopropyl)-hexahydrotriazine | 2'45" | 12 | 2.2 |
| Potassium 2-Ethylhexanoate | 3'15 | 12 | 1.9 |
| Sodium N-(2-hydroxy-5-nonylphenyl)methyl-N-methylglycinate | 3'30 | 12 | 1.9 |

The amounts of each catalyst composition shown in Table 15 were adjusted to give approximately the same cream time (about 12 seconds), in order to compare their performance regarding demold time and required use level. All of the trimerization catalysts in Table 15 worked well as components of the catalyst composition, and 1,8-diazabicyclo[5.4.0]undec-7-ene phenol salt was particularly effective.

While numerous catalysts and low molecular weight diols and triols are known separately for preparing polyurethane foams, the combination of a gelling catalyst with a trimerization catalyst, a cure accelerator as defined above, and optionally a blowing catalyst and/or a chain extender, is particularly effective in extending cream time and/or shortening demold-time.

Although the invention is illustrated and described herein with reference to specific embodiments, it is not intended that the subjoined claims be limited to the details shown. Rather, it is expected that various modifications may be made in these details by those skilled in the art, which modifications may still be within the spirit and scope of the claimed subject matter and it is intended that these claims be construed accordingly.

We claim:

1. A composition for use in making a polyurethane foam, the composition comprising:
   (a) a catalyst combination comprising (i) a gelling catalyst comprising a compound selected from the group consisting of triethylenediamine, 3-dimethylaminopropyl urea, N,N'-bis(3-dimethylamino-propyl)urea, 1-(N-methyl-3-pyrrolidino)methyl urea, 1,3-bis(N-methyl-3-pyrrolidino)methyl urea, and a combination of these;

(ii) a trimerization catalyst comprising a compound selected from the group consisting of TEDA propylene oxide 2-ethylhexanoic acid quat; 1,8-diazabicyclo[5.4.0]undec-7-ene, either alone or blocked with a phenol or a carboxylic acid; N-hydroxyalkyl quaternary ammonium carboxylate salts; N,N',N"-tris(dimethylaminopropyl)hexahydrotriazine; alkali metal carboxylates and a combinations of any of these; and (iii) a blowing catalyst comprising a compound selected from the group consisting of pentamethyldiethylenetriamine, permethylated triethylenetetramine, bis(dimethylaminoethyl)ether, 2-[N-(dimethylaminoethoxyethyl)-N-methylamino]ethanol; dimethylaminoethoxyethanol; N,N,N'-trimethyl-N'-3-aminopropyl-bis(aminoethyl) ether; N,N,N'-trimethyl-N'-aminopropyl-bis(aminoethyl) ether and a combination of these;

(b) one or more cure accelerators selected from the group consisting of glycerol, trimethylol propane, diglycerol, pentaerythritol, dipentaerythritol, and a combination of these; and (c) at least one blowing agent wherein the gelling catalyst, the trimerization catalyst, the blowing catalyst and the cure accelerator are present in the amounts as shown in wt % based on the total of the catalyst combination and the one or more cure accelerators:

| gelling catalyst | 14-35 |
| trimerization catalyst | 1.4-6 |
| blowing catalyst | 0.8-4 |
| cure accelerator | 55-83.8. |

2. The composition of claim 1, wherein the composition further comprises a chain extender comprising a compound selected from the group consisting of ethylene glycol, 1,4-butanediol and a combination of these.

3. The composition of claim 1, wherein the composition further comprises a phenol or a carboxylic acid that forms a salt with at least a portion of at least one of the gelling catalyst and the blowing catalyst.

4. The composition of claim 1, wherein the composition comprises 5 to 100 wt % of the gelling catalyst, the trimerization catalyst, the blowing catalyst and the cure accelerator in combination and 0 to 95 wt % of a chain extender comprising a compound selected from the group consisting of ethylene glycol, 1,4-butanediol and a combination of these.

5. The composition of claim 1, wherein the composition comprises 25 to 75 wt % of the gelling catalyst, the trimerization catalyst, the blowing catalyst and the cure accelerator in combination and 25 to 75 wt % of a chain extender comprising a compound selected from the group consisting of ethylene glycol, 1,4-butanediol and a combination of these.

6. The composition of claim 1, wherein the gelling catalyst, the trimerization catalyst, the blowing catalyst and the cure accelerator are present in the amounts as shown in wt % based on the total of the catalyst combination and the one or more cure accelerators:

| Component | wt % |
| --- | --- |
| Gelling catalyst | 24-32 |
| Trimerization catalyst | 2-5 |
| Blowing catalyst | 1-3 |
| Cure accelerator | 60-73. |

7. The composition of claim 6, wherein the composition comprises 55 to 65 wt % of the gelling catalyst, the trimerization catalyst, the blowing catalyst and the cure accelerator in combination and 35 to 45 wt % of a chain extender comprising a compound selected from the group consisting of ethylene glycol, 1,4-butanediol and a combination of these.

8. The composition of claim 2, wherein the gelling catalyst comprises triethylenediamine, the trimerization catalyst comprises 1,8-diazabicyclo[5.4.0]undec-7-ene phenol salt, the blowing catalyst comprises pentamethyldiethylenetriamine, the cure accelerator comprises glycerol and the chain extender comprises ethylene glycol.

9. The composition of claim 1 wherein the blowing agent comprises water.

10. The composition of claim 9 wherein the gelling catalyst comprises triethylenediamine.

11. The composition of claim 10 wherein the trimerization catalyst comprises 1,8-diazabicyclo[5.4.0]undec-7-ene.

12. The composition of claim 11 wherein the cure accelerator comprises glycerol.

13. The composition of claim 1 further comprising a cell stabilizer.

14. The composition of claim 13 wherein the cell stabilizer comprises a silicone surfactant.

15. The composition of claim 1 wherein the blowing catalyst comprise at least one member selected from the group consisting of 2-[N-(dimethylaminoethoxyethyl)-N-methylamino]ethanol; dimethylaminoethoxyethanol; N,N,N'-trimethyl-N'-3-aminopropyl-bis(aminoethyl)ether; N,N,N'-trimethyl-N'-aminopropyl-bis(aminoethyl)ether and mixtures thereof.

* * * * *